United States Patent [19]
Miller

[11] 3,943,726
[45] Mar. 16, 1976

[54] SOLAR COOLING SYSTEM FOR AN AUTOMOBILE

[75] Inventor: John H. Miller, Charlotte, N.C.

[73] Assignee: Lawrence Peska Associates, Inc., New York, N.Y.; a part interest

[22] Filed: Mar. 20, 1975

[21] Appl. No.: 560,154

[52] U.S. Cl. .................... 62/2; 98/2.11; 60/668; 136/89
[51] Int. Cl.² ............... H01L 31/04; F25B 27/00
[58] Field of Search .......... 62/2; 136/89; 60/668 X; 244/1 SP; 98/2, 2.11

[56] References Cited
UNITED STATES PATENTS

| | | |
|---|---|---|
| 2,970,456 | 2/1961 | Rice .................. 98/2.11 X |
| 3,353,191 | 11/1967 | Dahly .................. 62/2 X |
| 3,844,840 | 10/1974 | Bender .................. 136/89 |

Primary Examiner—William E. Wayner
Attorney, Agent, or Firm—Richard E. Nanfeldt

[57] ABSTRACT

A solar energy cell system is used as an electric supply source to operate an air conditioner or a fan ventilation system contained within the interior chamber of an automobile. The electrical circuit comprises a series circuit consisting of: the solar energy cells, a voltage regulator, a storage battery, a thermostatic temperature control and a ventilation fan or an automobile air conditioner.

3 Claims, 3 Drawing Figures

SOLAR COOLING SYSTEM FOR AN AUTOMOBILE

SUMMARY OF THE INVENTION

My invention relates to a unique and novel concept of operating a cooling system for an automobile operating on solar energy.

It is known from U.S. Pat. Nos.: 2,202,019 and 2,692,483 that solar energy has been employed to cool confined areas but these cited patents do not involve the application of solar energy to the operation of a cooling system for an automobile.

An object of my present invention is to provide a cooling system for an automobile, wherein the cooling system is operated by solar energy.

A further object of my invention is to provide a fuel conserving device for the operation of a cooling unit of an automobile.

A still further object of my invention is to provide a heating system for an automobile, wherein the heating system is operated by solar energy.

Another object of my invention is to provide a solar energy cooling system adaptable to a standard automobile.

An advantage of my invention is that it provides a means of cooling an automobile by a simply designed system without added fuel consumption.

Briefly, my invention comprises a plurality of solar energy cells operating an air conditioner or a fan ventilation system contained within the interior chamber of the automobile. The electrical circuit comprises a series circuit consisting of the solar energy cells, a voltage regulator, a storage battery, a thermostat temperature control and a ventilation fan or an automobile air conditioner.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
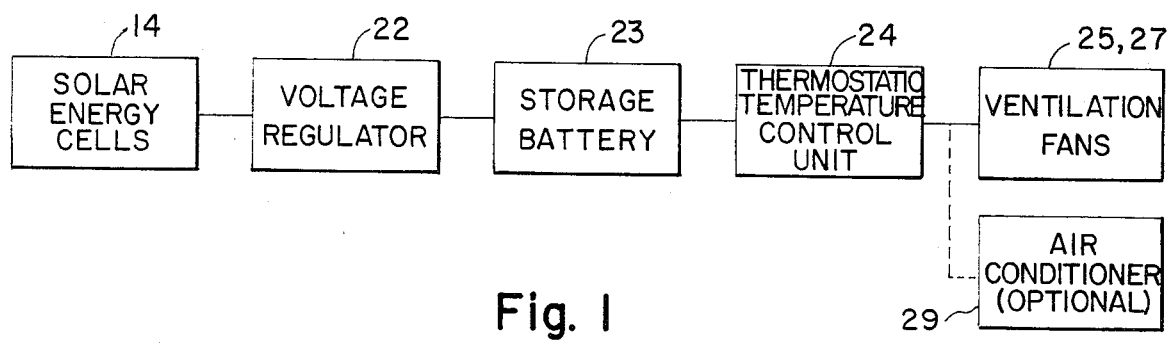
FIG. 1 illustrates a schematic diagram of the solar cooling system.
Figure 2:
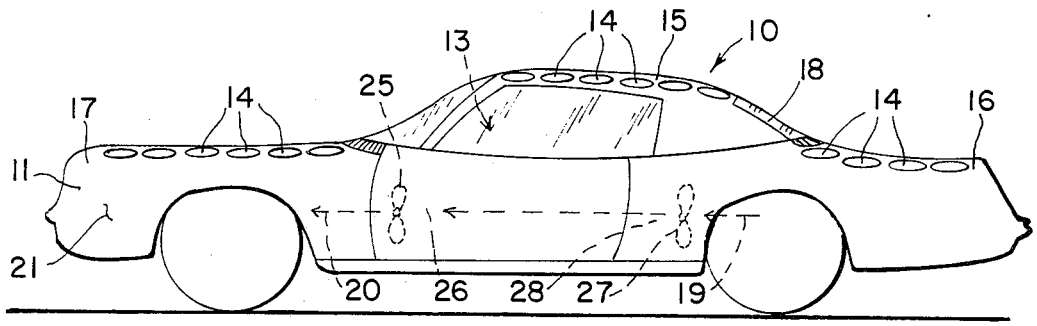
FIG. 2 illustrates a side cross sectional elevation view of the solar cooling system.
Figure 3:
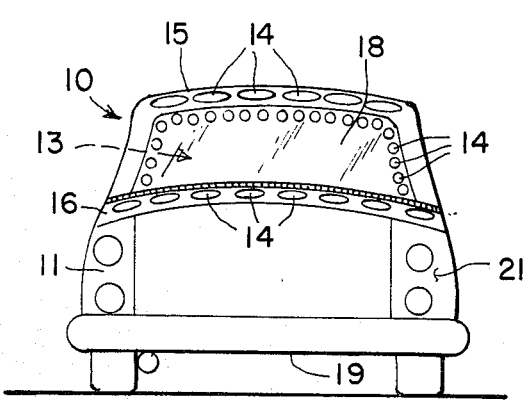
FIG. 3 illustrates a rear elevation of the solar cooling system.

Turning now descriptively to the drawings, in which similar reference characters denote similar elements throughout the several views, FIGS. 2–3 show a solar cooling system 10 for an automobile 11, wherein the said cooling system is contained within an interior chamber 13 of an automobile 11. The solar cooling system 10 comprises a standard automobile 11 with a plurality of solar energy cells 14 embedded in the roof 15, the trunk lid 16, the front hood 17 and along the periphery of the rear window 18 of the automobile 11. A plurality of cool air ducts 19 and hot air ducts 20 communicate between interior chamber 13 and the outside surface 21 of the automobile 11. The plurality of solar energy cells 14 are wired in series to a voltage regulator 22, a storage battery 23, and a thermostatic temperature control unit 24 as shown in FIG. 1. A ventilation fan 25 is positioned in the forward section 26 of chamber 13 as well as a second ventilation fan 27 in the rear section 28 of chamber 13, wherein fans 25, 27 are wired in series circuit to thermostatic temperature control unit 24. Alternatively, in place of the fans 25, 27, a standard automobile air conditioning unit 29 is wired in series circuit to control unit 24. The radiant energy of the sun is absorbed by the plurality of solar energy cells 14. The generated electrical energy from the solar energy cells 14 is stored by the storage battery 23 until control unit 24 activates electrical energy flow from storage battery 23 to the cooling unit 12. Consequently, anytime the temperature of chamber 13 exceeds the control unit setting 24, the cooling unit 12 is activated. The solar energy cells are constructed from well known standard materials such as a layer composite of silicion and boron.

A further embodiment of my present invention involves the replacement of the cooling unit 12 by a heating unit.

Hence obvious changes may be made in the specific embodiment of the invention described herein, such modifications being within the spirit and scope of the invention claimed, it is indicated that all matter contained herein is intended as an illustrative and not as limiting in scope.

Having thus described the invention, what I claim as new and desire to secure by Letters Patent of the United States is:

1. A solar cooling system for a standard automobile, which comprises:
   a. said standard automobile having a trunk lid, a front hood, a roof, and a rear window;
   b. a plurality of solar energy cells positioned on said roof, said trunk lid, and said front hood, and a periphery of said rear window;
   c. said plurality of solar energy cells wired in a series circuit to a voltage regulator, a storage battery, a thermostatic temperature control unit, and a cooling unit:
   d. said cooling unit contained in an interior chamber of said automobile;
   e. a plurality of cool air ducts communicating between said interior chamber and an outside surface of said automobile; and
   f. a plurality of hot air ducts communicating between said interior chamber and said outside surface of said automobile.

2. A solar cooling system as recited in claim 1, wherein said cooling unit comprises:
   a. a ventilation fan contained in a rear section of said interior chamber; and
   b. a second ventilation fan contained in a forward section of said interior chamber.

3. A solar cooling system as recited in claim 1, wherein said cooling unit comprises an air conditioning unit.

* * * * *